United States Patent

[11] 3,601,874

[72] Inventors Minoru Sakamoto;
 Tokuichi Nagato, both of Honolulu, Hawaii
[21] Appl. No. 855,532
[22] Filed Sept. 5, 1969
[45] Patented Aug. 31, 1971
[73] Assignee Shuichi Sakamoto
 Honolulu, Hawaii
 a part interest

[54] ROTARY RASPING SURFACE SCARIFYING ATTACHMENT
 5 Claims, 4 Drawing Figs.
[52] U.S. Cl. ............ 29/76, 144/115
[51] Int. Cl. ............ B23d 67/00, B27c 1/00
[50] Field of Search ............ 144/115, 208, 118; 143/85; 29/76, 78

[56] References Cited
UNITED STATES PATENTS
| | | | |
|---|---|---|---|
| 2,178,169 | 10/1939 | Goertzen | 144/115 |
| 2,453,371 | 11/1948 | Hobson | 144/115 X |
| 2,544,841 | 3/1951 | La Fontaine | 144/115 X |
| 2,745,653 | 5/1956 | Deason | 144/115 X |
| 2,949,661 | 8/1960 | Credit | 29/78 |
| 3,115,911 | 12/1963 | Van Auken | 143/85 |
| 3,212,165 | 10/1965 | Shank | 29/76 |
| 3,220,449 | 11/1965 | Franklin | 143/185 |

Primary Examiner—Harrison L. Hinson
Attorneys—Clarence A. O'Brien and Harvey B. Jacobson ABSTRACT: A rotary rasping surface texturing attachment comprising a cupped rotary saw and a companion depth-of-cut adjusting safety guard. This attachment can, if desired, replace a detachable circular saw and safety guard assembly on a portable handle-equipped electric power unit. No alterations in the power unit are resorted to. All that is necessary is to detach the usual circular saw and guard and substitute the herein disclosed attachment, using the same bolting means to mount and retain it in place. The stated attachment lends itself for use in (1) producing a rough-sawn but desired surface finish on suitably receptive lumber and timber and (2) for use in removing paint, stains and the like from wood surfaces and (3) scarifying room wall surfaces in preparation for application of new plaster and similar wall-finishing jobs.

PATENTED AUG 31 1971  3,601,874

Minoru Sakamoto
Tokuichi Nagato
INVENTORS

BY Clarence A. O'Brien
and Harvey B. Jacobson
Attorneys

ROTARY RASPING SURFACE SCARIFYING ATTACHMENT

This invention relates to certain new and useful improvements in attachments for portable circular electric power says and has to do, more particularly, with a work surface conditioning attachment which when used by a person skilled in handling power saws or the like can be effectually employed for roughening a selected surface on appropriate lumber to achieve a predetermined finish, and in scarifying painted and papered walls in preparation for whatever purposes desired.

Persons conversant with the field of endeavor under advisement are aware that portable circular electric power saws are of many and varied types and that, generally stated, the electric motor or other prime mover is encased in a housing which is usually provided with a U-shaped or an equivalent handgrip having an off-and-on trigger-type switch and other equipment. The forward body portion of the housing is fashioned into and provides a flat-faced neck which supports a cutter head of one type or another. More specifically and as is herein a matter of significance, the circular flat-ended neck is provided with a bearing and a shaft projecting beyond the flat surface. This construction and arrangement of parts serves to accommodate a rotary rasping blade having varying types of surface rasping and texturing teeth coating with an encompassing guard. The guard varies in construction depending on the particular purpose for which the blade has been perfected.

There has long existed a practical need for a power actuated rotary rasping blade wherein the rasping teeth of the blade or disc are disposed in a plane at right angles to the forward or outer surface whereby to adapt the thus constructed blade for producing a rough-sawn finish on lumber and timber surfaces and for use in scarifying, scraping and removing old paint and wallpaper, to assist in eradicating stains from wall and floor surfaces and for cutting and removing coverings from various wood surfaces.

Briefly the concept herein under advisement is characterized by an attachment which embodies, more particularly stated, a cupped-type rotary rasping device which embodies a disc or blade portion whose outer marginal or peripheral edge is provided with a flange, the free edge of the flange being serrated and the serrations defining rasping and texturing teeth. The teeth will vary in shape and size but are preferably such that the alternating teeth are bent laterally or outwardly in opposite directions to conform, as it were, with crosscut teeth and ripsaw teeth. The central portion of the disc is such that it can have abutting contact with the terminal end of the shaft, that is, the usual shaft which is provided with a screw-threaded socket to accommodate a bolt, the bolt serving to fasten the disc on the shaft. In addition, the toothed flange or edge of the blade is rotatable in an orbital path within the confines of the rim or equivalent marginal portion of a complemental safety guard, more particularly, a guard having a plate portion which is interposed between the disc or blade and end of the motive source body and removably bolted thereon.

The cupped blade is preferably made of one piece of steel and the guard is made preferably, but not necessarily, of two wood components, that is, a discoidal mounting plate provided on its outward or obverse marginal portion with an endless ring, said ring defining the guard rim for the teeth of the blade and also having a flat face which serves as a gauge to abut the work surface and to regulate the depth of cut of the rotating rasping teeth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
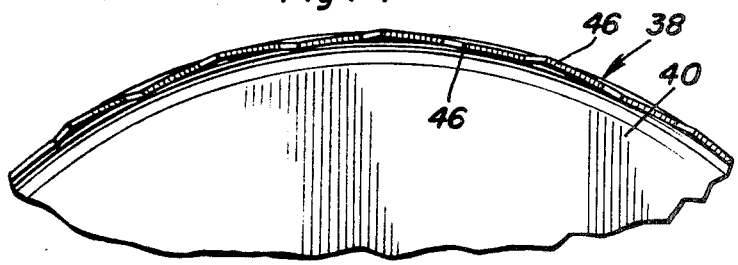

And FIG. 4 is a fragmentary elevational view on an enlarged scale showing the manner in which the alternating teeth are offset to produce the desired crosscut effect.

Figure 1:
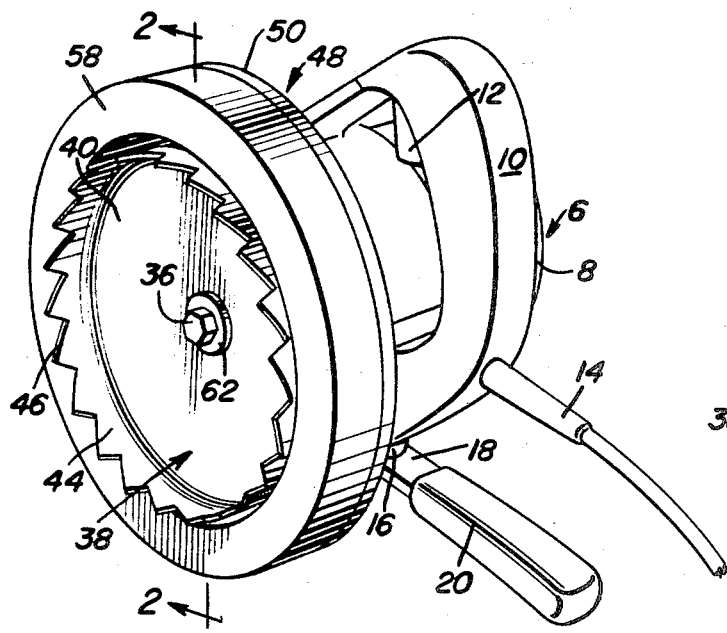
FIG. 1 is a view in perspective of a power saw and an attachment therefor constructed in accordance with the principles of the invention and showing how the attachment is constructed and mounted.
Figure 2:
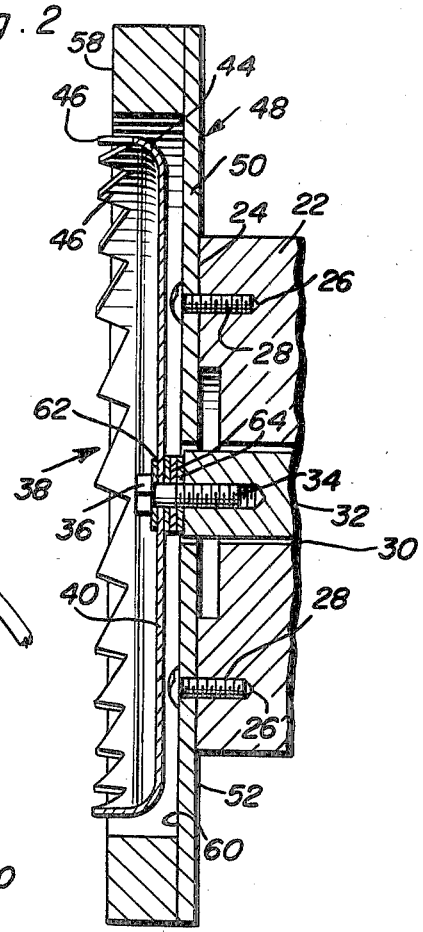
FIG. 2 is an enlarged view with parts in section and elevation taken approximately on the plane of the line 2—2 of FIG. 1 looking in the direction of the arrows.
Figure 3:
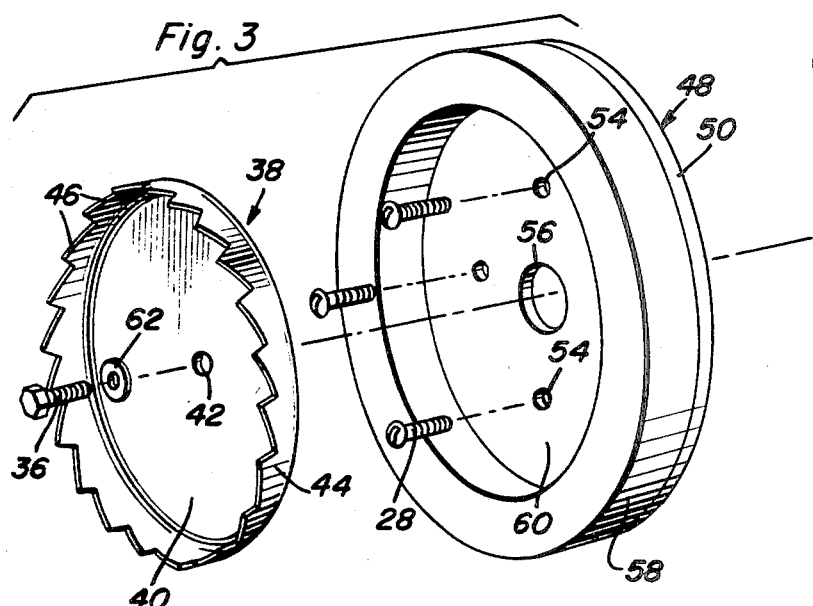
FIG. 3 is an exploded perspective view of the attachment that is the two principal component parts thereof.

Referring now to the views in particular and with respect to FIG. 1 it will be noted that, generally stated, the motive source, a power saw unit, for example, is designated by the numeral 6. It comprises a casing or housing which can be said to be of somewhat general construction and which is denoted generally at 8. The main fixedly mounted handle or handgrip is denoted, generally stated, by the numeral 10 and is provided at a suitable point with a finger actuatable off-and-on trigger or switch button as at 12. The current conductor, also of usual construction, is denoted by the numeral 14. There is a boss 16 on the bottom of the housing or casing which is provided with a securing screw (not detailed) for connecting a shank portion 18 of an auxiliary handgrip 20 in place. This handgrip is an optional feature but is in many instances readied for use. As shown perhaps best in FIG. 2, the reduced necklike body portion of the saw unit is denoted by the numeral 22. This portion has a terminal flat end 24 and is provided with circumferentially spaced screw-threaded sockets 26 to accommodate screw-threaded headed bolts or equivalent fasteners 28 which will be referred to later. The bore may be here described as an axial bearing 30 for the usual motor-driven shaft 32. The shaft is provided with a screw-threaded axial socket 34 to accommodate the customary headed bolt 36, that is the shank portion thereof as perhaps clear from FIG. 2. These features are employed for attaching a customarily used rotary power saw and guard (not here shown) such as is employed, for example, on a Porter Cable Power Saw. As already suggested, the idea here is to detach the customary guard and saw (not shown) and to substitute the improved attachment therefor, that is a rotary rasping attachment which when in place in lieu of the usual disclike saw and guard functions to achieve special timber surface roughening and work surface scarifying and texturing results. The rotary rasping device here is preferably made of appropriate steel and is denoted by the numeral 38 and comprises a flat-faced disc or blade 40 having a bolt hole 42 to accommodate the bolt means 36 in the manner shown in FIGS. 1 and 2. The endless or annular forwardly projecting flange is denoted by the numeral 44 and the edge thereof is provided with circumferentially spaced alternating rasping teeth 46. The blade is sometimes designated as a flat-faced disc whose marginal portion is provided with an angled endless flange whose edge is serrated with the serrations defining teeth. The teeth can also be referred to, as already mentioned, as crosscut teeth or ripsaw teeth. This specially constructed special purpose device is cooperable with the unique guard 48. This guard while capable of being made of other suitable materials is usually made of wood or equivalent economical material. It comprises a circular or discoidal plate 50 having an inward or reverse face 52 abutting the surface 24 and secured thereto by passing bolts or fastenings 28 through the bolt holes 54 in a seemingly obvious manner. An opening 56 (FIG. 3) is provided at the center to accommodate the aforementioned power-driven shaft 32. The ringlike collar or annulus is denoted by the numeral 58 and it abuts the outside or obverse face of the plate, that is the face 60 and is suitably secured in place. The cross section of the collar is such that it cooperates with the plate in defining a recess for the special purpose rotary rasping blade 38. One of the aforementioned washers is denoted at 62. The other washers are denoted in FIG. 2 at 64 and encircle the shank of the aforementioned bolt and provide adjusting shims in a seemingly obvious manner (FIG. 2).

In practice the usual guard means and circular power saw (not here shown) are removed from the necklike body 22 of the aforementioned power unit 6. Then the two-part attachment is substituted therefor. It is evident that the guard means 48 is bolted in place as clearly evident in FIGS. 1 and 2. The rotary rasping blade is placed within the confines of the recess of the guard and it is bolted in place as shown using the shims or washers for depth of cut regulation means.

The attachment shown and described has many uses in various lines of endeavor which need not, it is believed, be more explicitly recited. In any event the attachment well serves the purposes for which it has been devised.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A rotary rasping and surface texturing device comprising, in combination, a portable manually manipulatable motive source, a prime mover, for example, embodying a rigid elongated necklike body portion provided with an axial bearing, a motion-transmitting shaft operatively mounted for rotation in said bearing, said body portion having a terminal flat-faced end surface, said shaft having a terminal flat end projecting a minimal distance beyond said end surface, said terminal end of said shaft being provided with an axial screw-threaded socket, a safety guard embodying a discoidal plate of a diameter greater than the outside diameter of said necklike body portion, said plate being provided at its center with an opening, the terminal end of said shaft being aligned with and projecting into said opening, accessible fasteners connecting said plate to said end surface, said plate having a ringlike collar superimposed thereon oriented therewith and fixed in place, said collar being of predetermined diameter and constituting a rim, said rim having a planar work-abutting surface, said rim in conjunction with the coacting outward surface of said plate providing a blade receiving and pocketing recess, a rotary rasping and surface texturing blade embodying a disc having an axial portion provided with a bolthole aligned with the aforementioned socket, an assembling and securing bolt having a shank passing through said bolthole and screwed into said socket and serving to operatively mount said disc on said shaft, said disc being of a diameter less than the inner diameter of said collar, said disc having an integral marginal annular flange projecting outwardly at right angles relative to said disc, said flange being concentric to and spaced inwardly from the inner peripheral surface of said collar, said flange having an endless edge provided with sawlike rasping teeth which normally project beyond the planar work-abutting surface of said collar, the inner peripheral surface of said collar encompassing but being spaced from the flange and teeth, and handling means for the overall device carried by and cooperable with said necklike body portion.

2. The combination defined in and according to claim 1, and wherein a plurality of readily applicable and removable selectively usable washers are mounted on and encircle said shank, are interposed between the terminal end of said shaft and an inward face of the apertured portion of said disc, said washers constituting adjusting shims and which function to facilitate adjusting the degree of projection and depth-of-cut of the teeth relative to the outward work-abutting surface of said rim.

3. The combination defined in and according to claim 2, and wherein said blade is made of one piece of sheet material and is cupped, said teeth being individually alternatively bent in opposite directions similar to crosscut teeth such as are employed, for example, on a rotary circular saw blade.

4. The combination defined in and according to claim 3, and wherein the plate of said guard is made of wood and said collar is also made of wood, the outer peripheral margin of said collar being flush with the adjacent outer peripheral edge of said discoidal plate.

5. A readily applicable and removable multipurpose attachment for coacting end portions of a necklike body portion having an axial bearing and a motion-transmitting shaft mounted for rotation in said bearing with a terminal end portion terminating in a plane substantially flush with a terminal end portion of said necklike body portion comprising, in combination, a flat-faced discoidal plate having an axial opening and provided with means whereby said plate can be removably mounted on the terminal end of said necklike body portion, said plate having an outwardly disposed flat surface, an outer peripheral edge portion of said surface having a ringlike collar fixedly mounted thereon, said collar having an outer peripheral surface flush with the outer peripheral surface of said plate and an inner peripheral surface of a predetermined inner diameter and providing a blade enclosing and pocketing recess, said collar in conjunction with said plate constituting a guard, said collar having a planar surface which is adapted when in use to provide a gauge-forming, work-abutting face, a rotary cupped rasping and surface texturing blade enclosed and pocketed in said recess and embodying a disc having an apertured portion to accommodate means for positioning and retaining said blade within the confines of said recess, said disc being provided on an outer marginal edge with an integral annular flange projecting outwardly and at right angles to the plane of the disc, said flange having an endless edge provided with sawlike rasping teeth adapted to contact and act on a predetermined work surface, said flange being of an outside diameter that it is functionally located concentrically and inwardly of the inner peripheral surface of said collar.